United States Patent
Fisher

(10) Patent No.: US 7,203,383 B2
(45) Date of Patent: Apr. 10, 2007

(54) HANDWRITTEN CHARACTER RECORDING AND RECOGNITION DEVICE

(75) Inventor: Edward N. Fisher, Madison, WI (US)

(73) Assignee: Thinkpen LLC, Madison, WI (US)

( * ) Notice: Subject to any disclaimer, the term of this patent is extended or adjusted under 35 U.S.C. 154(b) by 49 days.

(21) Appl. No.: 10/468,751

(22) PCT Filed: Feb. 22, 2001

(86) PCT No.: PCT/US01/05689

§ 371 (c)(1),
(2), (4) Date: Aug. 22, 2003

(87) PCT Pub. No.: WO02/069247

PCT Pub. Date: Sep. 6, 2002

(65) Prior Publication Data

US 2004/0114834 A1 Jun. 17, 2004

(51) Int. Cl.
*G06K 9/22* (2006.01)
(52) U.S. Cl. .................. 382/314; 382/312; 382/313; 382/188
(58) Field of Classification Search ........... 345/182, 345/184, 6, 287.2, 175, 179, 104, 44, 187; 382/312, 314, 284, 188, 189, 106, 313, 187; 422/68.1, 102, 104, 119, 58; 250/556; 358/400, 358/471, 473, 482, 513; 209/597, 604; 365/183
See application file for complete search history.

(56) References Cited

U.S. PATENT DOCUMENTS

| | | | |
|---|---|---|---|
| 4,751,741 A | 6/1988 | Mochinaga et al. | 382/188 |
| 5,103,486 A | 4/1992 | Grippi | 382/116 |
| 5,215,397 A | 6/1993 | Taguchi et al. | 401/194 |
| 5,226,091 A | 7/1993 | Howell et al. | 382/107 |
| 5,247,137 A | 9/1993 | Epperson | 178/19.04 |
| 5,484,966 A | 1/1996 | Segen et al. | 178/18.09 |

(Continued)

FOREIGN PATENT DOCUMENTS

JP 409114588 A * 5/1997

(Continued)

*Primary Examiner*—Anh Hong Do
(74) *Attorney, Agent, or Firm*—Craig A. Fieschko, Esq.; DeWitt Ross & Stevens S.C.

(57) ABSTRACT

The invention is an electronic recording and computing device that resides within or on a pen shaped object for the purpose of recording and processing handwritten text or graphics. The device includes a marking implement that may be a pencil, ink pen, non-marking tip, chalk, crayon, marker, paint, laser marking tool, or any other instrument used for writing or marking. The device records motion and marking with one or more of each of the following components: image sensor (1), light source (5), light detector, force sensor (3), contactor, microprocessor, volatile and non-volatile memory, analog to digital converter. Movement of the apparatus is sensed and recorded by means of the image sensor (1) and optical navigation software which tracks microscopic and/or macroscopic features of the writing surface. The orientation of the pen to the writing surface is electronically sensed and recorded by casting a plane wave of light on the surface and detecting the amount received back with several light sensors placed in a specific orientation with each other.

20 Claims, 3 Drawing Sheets

U.S. PATENT DOCUMENTS

| | | | |
|---|---|---|---|
| 5,517,579 A | 5/1996 | Baron et al. | 382/187 |
| 5,774,602 A * | 6/1998 | Taguchi et al. | 382/314 |
| 5,852,434 A | 12/1998 | Sekendur | 345/179 |
| 5,920,401 A * | 7/1999 | Street et al. | 358/400 |
| 5,959,617 A | 9/1999 | Bird et al. | 345/182 |
| 5,960,124 A * | 9/1999 | Taguchi et al. | 382/284 |
| 5,977,958 A | 11/1999 | Baron et al. | 345/179 |
| 6,081,261 A | 6/2000 | Wolff et al. | 327/307 |
| 6,088,025 A * | 7/2000 | Akamine et al. | 345/175 |
| 6,151,015 A | 11/2000 | Badyal et al. | 345/179 |
| 6,278,440 B1 | 8/2001 | Katsurahira et al. | 345/163 |
| 6,330,057 B1 | 12/2001 | Lederer et al. | 356/28 |
| 6,348,914 B1 | 2/2002 | Tuli | 345/179 |
| 6,424,407 B1 | 7/2002 | Kinrot et al. | 356/28 |
| 6,452,683 B1 | 9/2002 | Kinrot et al. | 356/499 |
| 6,512,838 B1 * | 1/2003 | Rafii et al. | 382/106 |
| 6,573,887 B1 * | 6/2003 | O'Donnell, Jr. | 345/179 |
| 6,592,039 B1 | 7/2003 | Smith et al. | 235/462.49 |
| 6,597,348 B1 * | 7/2003 | Yamazaki et al. | 345/175 |
| 6,686,579 B2 | 2/2004 | Fagin et al. | 250/208.1 |
| 6,985,643 B1 * | 1/2006 | Fahraeus et al. | 382/313 |
| 2003/0112220 A1 | 6/2003 | Yang et al. | 345/156 |

FOREIGN PATENT DOCUMENTS

| | | |
|---|---|---|
| KR | 2001016506 | 3/2001 |
| KR | 2001067896 | 7/2001 |
| KR | 2001082461 | 8/2001 |
| KR | 2001094797 | 11/2001 |
| WO | WO 02/48853 A1 | 6/2002 |
| WO | WO 02/069247 A1 | 9/2002 |

* cited by examiner

HANDWRITTEN CHARACTER RECORDING AND RECOGNITION DEVICE

FIELD OF INVENTION

The invention relates to handwritten character input and recognition devices. More particularly the device provides a means to electronically record handwritten graphics and record and recognize hand written characters.

BACKGROUND ART

There are numerous patents related to this type of device. The distinguishing features lie in the method or methods used to sense the movement of the device to the writing or marking surface. All such devices employ a button, contactor, or force sensor to sense when the apparatus is in contact with the writing surface. The combination of the above data can be used to record the movement and marking of the pen.

One method attempts to measure forces applied to the pen tip or pen cartridge by using strain gauges, force sensors, piezo-electric devices, or the like (U.S. Pat. Nos. 4,751,741, 5,215,397). These forces are used to calculate the movement of the device across the page.

Another method uses accelerometers or gyroscopes to sense acceleration and deceleration of the pen (U.S. Pat. Nos. 188,392, 5,247,137, 5,517,579).

An optical technique is used to image a known pattern on the page and use this information to calculate movement of the apparatus in (U.S. Pat. No. 5,226,091).

Finally there are also approaches that use a combination of the above sensing techniques. These include a combination of force and optical sensing (U.S. Pat. No. 5,215,397) and a combination of acceleration and ultrasonics (U.S. Pat. No. 5,517,579).

THE PRESENT INVENTION

The invention is an electronic recording and computing device that resides within or on a pen shaped object for the purpose of recording and processing handwritten text or graphics. The device includes a marking implement that may be a pencil, ink pen, non-marking tip, chalk, crayon, marker, paint, laser marking tool, or any other instrument used for writing or marking. The device records motion and marking with one or more of each of the following components: image sensor, light source, light detector, force sensor, contactor, microprocessor, volatile and non-volatile memory, analog to digital converter. Movement of the apparatus is sensed and recorded by means of the image sensor and optical navigation software which tracks microscopic and/or macroscopic features of the writing surface. The orientation of the pen to the writing surface is electronically sensed and recorded by casting a plane wave of light on the surface and detecting the amount received back with several light sensors placed in a specific orientation with each other. This information is used to correct optical navigation data that is distorted by the orientation of the pen to the writing surface. Data may be processed by on board application software and/or stored for later retrieval. Data may be transmitted through a docking station or via a wireless technology. The transmitted information may later be used with software for tasks such as optical character recognition, signature authentication, or image reconstruction.

It is an object of the invention to eliminate the need for expensive and inaccurate accelerometers or gyroscopes, to eliminate unreliable and inaccurate mechanical systems, and to use inexpensive off the shelf electronic components. It is furthermore an object of the present invention to rely primarily on optical methods for sensing movement and orientation of the device to the marking surface because these well developed technologies allow for a high level of accuracy and repeatability.

FIRST EMBODIMENT

Figure 1:
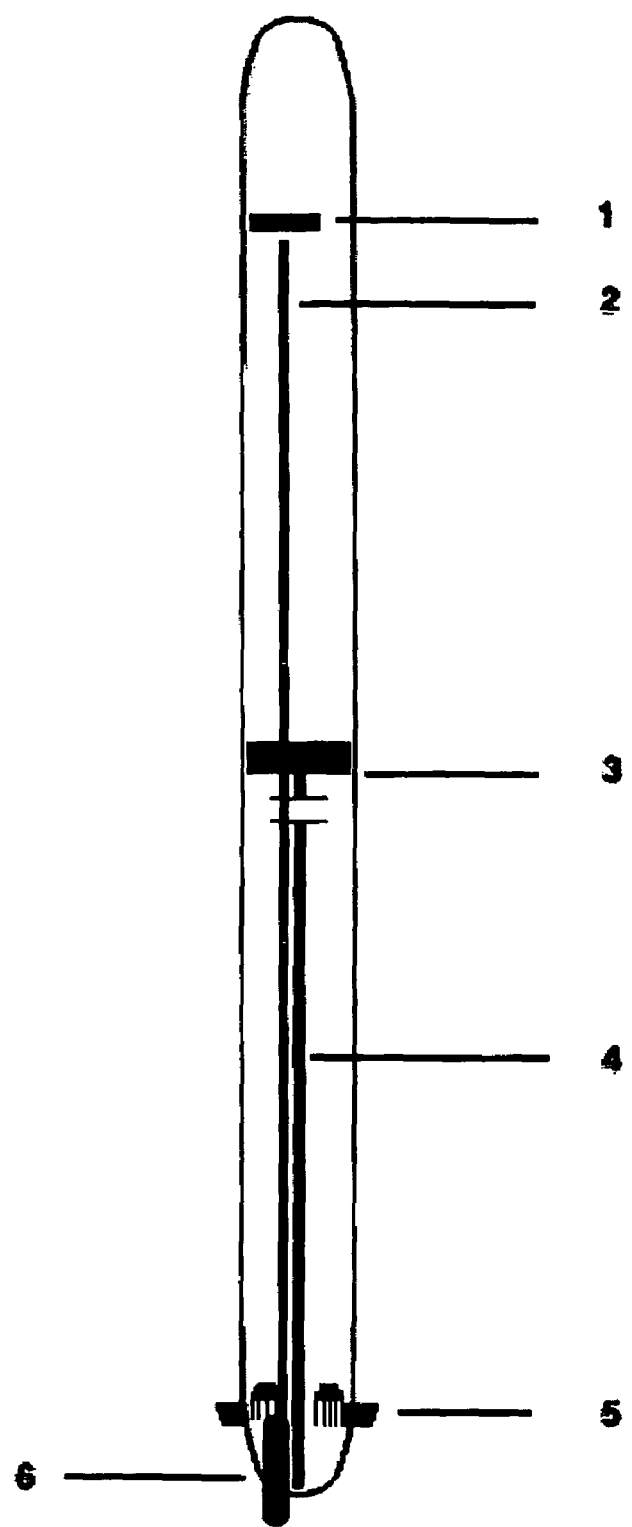
FIG. 1 is an embodiment of the device including 1 image sensor, 2 fiber optic image pipe, 3 button or force sensor, 4 writing implement cartridge and force sensor actuator, 5 light source and light sensor array, and 6 telecentric lens system.

A first embodiment of the device is shown in FIG. 1 and is constructed in accordance with claims of the present invention. A pen shaped enclosure provides a housing for all components of the system such that the apparatus may operate autonomously.

The embodiment also comprises a marking implement for writing characters or making graphical markings on paper or other surface. The marking implement in this first embodiment is ink. The marking implement resides within a cartridge 4 such that the cartridge 4 may move within the pen so that it may engage a force sensor 3 for detecting when the tip of the device is in contact with the marking surface (FIG. 1).

Figure 3:
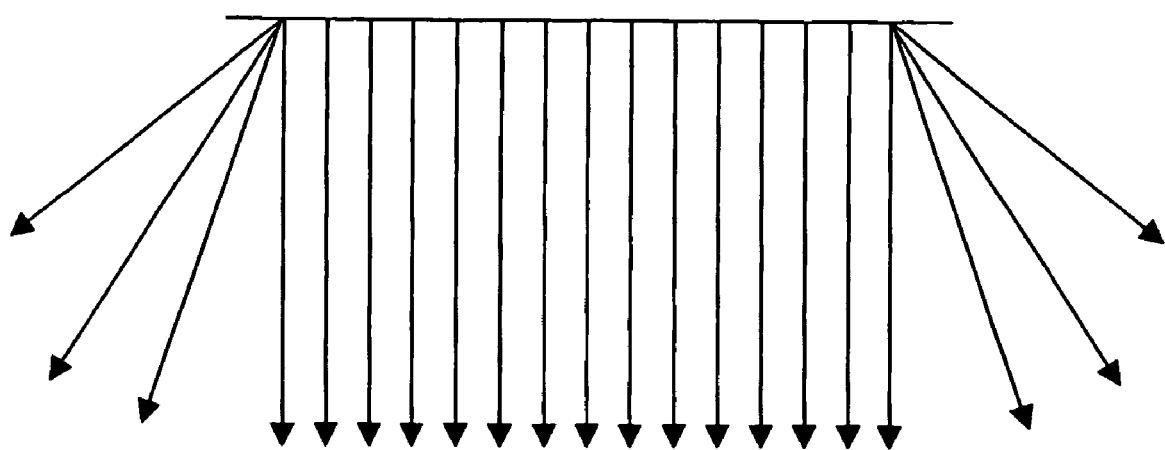
FIG. 3 is a plane wave of light may be created with an array of light sources thus providing consistent light intensity across a large area.

This embodiment is also comprised of one or more infrared light emitting diodes 5 arranged in a manner to produce a plane wave of light which is to be incident on the marking surface (FIG. 3).

Figure 2:
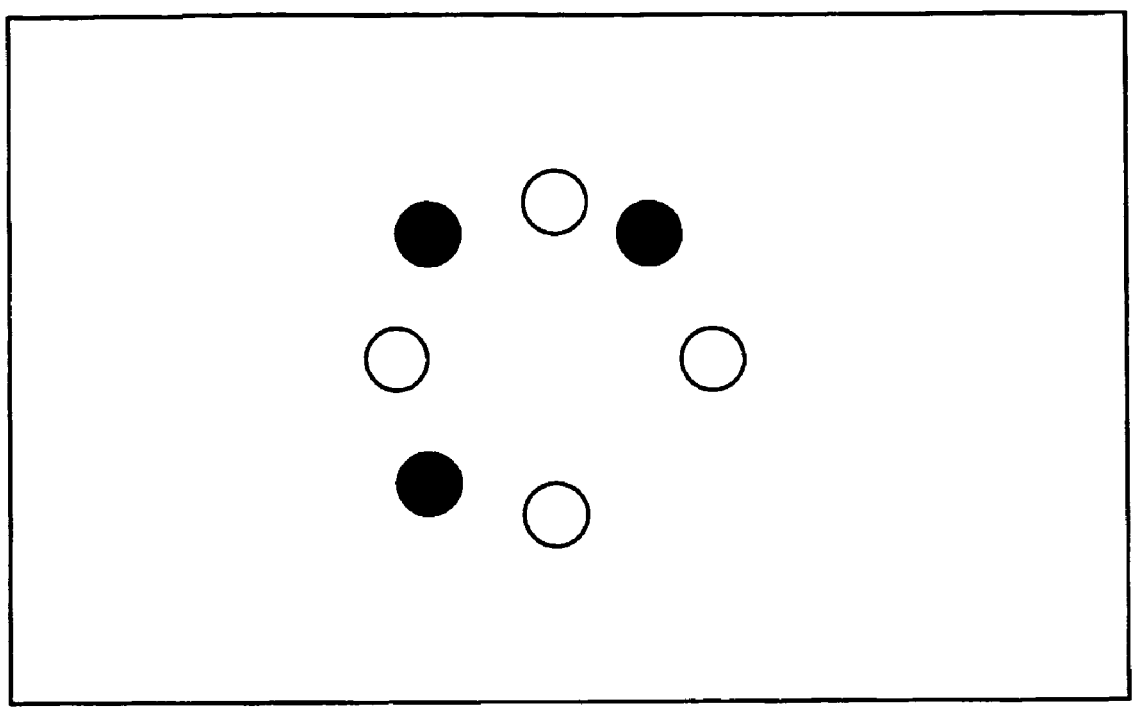
FIG. 2 is a possible arrangement of light sensors (filled) and light sources (not-filled) used for sensing orientation of the apparatus relative to the marking surface.

The embodiment is also comprised of three infrared phototransistors for detecting infrared light from said light emitting diodes 5 that has reflected off the marking surface. The phototransistors are arranged in a specific orientation to each other in this embodiment of the device (FIG. 2). The amount of infrared light detected is used to calculate the distance and or angle of inclination of the apparatus to the marking surface. Using data obtained from two light sensors the angle of inclination of the apparatus relative to the writing surface may be calculated in two orthogonal directions.

The embodiment is also comprised of an imaging system that includes a charged coupled device image sensor 1, two lenses 6, and a fiber optic image pipe (FIG. 1). The two lenses 6 are chosen such that the image obtained by the imaging system 6 provides a telecentric view of the page, this ensures there is little or no distortion in the image. This imaging system 6 is used to rapidly obtain images of macroscopic and/or microscopic features of the marking surface. These images are used in conjunction with optical navigation software capable of comparing these images and mathematically calculating the motion of the apparatus relative to the marking surface.

The embodiment also consists of a microprocessor, memory, and application software that includes said optical navigation as well as software necessary for processing data obtained from said phototransistors. This information may be stored in memory for later retrieval or transmitted in real time to a personal computer or other computing device.

The embodiment of the device also includes a display and several buttons so the user may interact with the device and invoke application software or data transmission.

This embodiment of the device includes electronic hardware and/or software to support the transmission of data via a wired or wireless means.

The invention claimed is:

1. A handwriting implement wherein the implement may be manipulated over a writing surface to simulate or generate the creation of written matter, and wherein such manipulation generates machine-readable data representing the written matter, the implement comprising:
   a. a light source on the implement which emits incident light onto the writing surface;
   b. an image sensor on the implement which captures the image of the writing surface;
   c. an array of light sensors on the implement, separate from the image sensor, which capture incident light reflected from the writing surface;
   d. a processor on the implement:
      (1) receiving captured images from the image sensor during the motion of the implement over the writing surface, and generating data therefrom representing the motion of the implement over the writing surface;
      (2) receiving die captured incident light from the light sensors, and generating data therefrom representing the orientation of the implement with respect to the writing surface.

2. The handwriting implement of claim 1 further comprising a telecentric lens system through which the image sensor captures the image of the writing surface.

3. The handwriting implement of claim 1 further comprising a light pipe directing the image of the writing surface to the image sensor.

4. The handwriting implement of claim 1 further comprising an implement tip to which a force sensor is connected, wherein the force sensor detects contact of the tip with a writing surface to actuate data generation.

5. The handwriting implement of claim 4 wherein the implement tip includes an ink-dispensing marking implement.

6. The handwriting implement of claim 1 wherein the light source emits a plane wave of incident light.

7. The handwriting implement of claim 1 wherein the light emitted by the light source is not In the visible spectrum.

8. The handwriting implement of claim 1 wherein the light sensors detect light in wavelengths outside the visible spectrum.

9. A handwriting implement wherein the implement may be manipulated over a writing surface to simulate or generate the creation of written matter, and wherein such manipulation generates machine-readable data representing the written matter, the implement comprising:
   a. a light source which emits incident light onto the writing surface;
   b. a telecentric lens system through which images of the lighted writing surface pass;
   c. an image sensor capturing images of the writing surface from the telecentric lens system;
   d. an array of light sensors, separate from the image sensor, which capture incident light reflected from the writing surface;
   e. a processor;
      (1) receiving the captured images from the image sensor during the motion of the implement over the writing surface, and
      (2) generating data therefrom representing the motion of the implement over the writing surface.

10. The handwriting implement of claim 9 further comprising a light pipe through which images of the lighted writing surface pass.

11. The handwriting implement of claim 9 wherein the processor additionally:
    a. receives the captured incident light from the light sensors, and
    b. generates data therefrom representing the orientation of the implement with respect to the writing surface.

12. The handwriting implement of claim 9 wherein the light sensors detect light in wavelengths outside the visible spectrum.

13. The handwriting implement of claim 9 further comprising an implement tip to which a force sensor is connected, wherein the force sensor detects contact of the tip with a writing surface to actuate data generation.

14. The handwriting implement of claim 9 wherein the light source emits a plane wave of incident light.

15. The handwriting implement of claim 9 wherein the light emitted by the light source is not in the visible spectrum.

16. A handwriting implement wherein the implement may be manipulated over a writing surface to simulate or generate the creation of written matter, and wherein such manipulation generates machine-readable data representing the written matter, the implement comprising:
    a. a light source which emits incident light onto the writing surface;
    b. a telecentric lens system through which images of the lighted writing surface pass;
    c. an image sensor capturing images of the writing surface from the teleceniric lens system;
    d. an array of light sensors, separate from the image sensor, which capture incident light reflected from the writing surface;
    e. a processor:
       (1) receiving the captured images from the image sensor during the motion of the implement over the writing surface, and generating data therefrom representing the motion of the implement over the writing surface;
       (2) receiving the captured incident light from the light sensors, and generating data therefrom representing the orientation of the implement with respect to the writing surface.

17. The handwriting implement of claim 16 wherein the light source emits a plane wave of incident light.

18. The handwriting implement of claim 16 further comprising a light pipe directing the image of the writing surface to the image sensor.

19. The handwriting implement of claim 16 wherein the incident light emitted by the light source and captured by the array of light sensors is not in the visible spectrum.

20. The handwriting implement of claim 16 wherein the light source includes multiple light emitters arrayed in a plane to emit a plane wave of incident light within the pine.

* * * * *